US009677035B2

(12) United States Patent
Welledits

(10) Patent No.: US 9,677,035 B2
(45) Date of Patent: Jun. 13, 2017

(54) DEVICE AND METHOD FOR HEATING A FERMENTABLE STARTING MATERIAL FOR BEVERAGE PRODUCTION

(71) Applicant: O. SALM & CO. GES.M.B.H., Vienna (AT)

(72) Inventor: Albert Welledits, Vienna (AT)

(73) Assignee: O. SALM & CO. GES.M.B.H., Vienna (AT)

( * ) Notice: Subject to any disclaimer, the term of this patent is extended or adjusted under 35 U.S.C. 154(b) by 0 days.

(21) Appl. No.: 14/782,381

(22) PCT Filed: Apr. 2, 2014

(86) PCT No.: PCT/EP2014/056563
§ 371 (c)(1),
(2) Date: Oct. 5, 2015

(87) PCT Pub. No.: WO2014/161870
PCT Pub. Date: Oct. 9, 2014

(65) Prior Publication Data
US 2016/0083678 A1     Mar. 24, 2016

(30) Foreign Application Priority Data
Apr. 3, 2013   (DE) .......... 10 2013 205 844

(51) Int. Cl.
*C12C 7/04* (2006.01)
*C12C 7/22* (2006.01)
(Continued)

(52) U.S. Cl.
CPC .......... *C12C 7/04* (2013.01); *C12C 7/22* (2013.01); *F28D 15/00* (2013.01); *F28D 20/02* (2013.01);
(Continued)

(58) Field of Classification Search
CPC .......... C12C 7/04–7/067; C12C 7/22; F28D 2020/0047; F28D 20/026; F28D 15/00; F28D 2021/0042
(Continued)

(56) References Cited

U.S. PATENT DOCUMENTS 2,555,938 A * 6/1951 Seligman .......... C12C 7/22
426/492
2,933,885 A * 4/1960 Vago .......... F01K 3/00
122/35
(Continued)

FOREIGN PATENT DOCUMENTS

AT        390 266 B    4/1990
DE      43 04 975 C1   3/1994
(Continued)

OTHER PUBLICATIONS

Esam M. Alawadhi et al., "A solidification process with free convection of water in an elliptical enclosure," Energy Conversion and Management, Elsevier Science Publishers, vol. 50, No. 2, Feb. 1, 2009, pp. 360-364, XP025684595.

*Primary Examiner* — Drew Becker
(74) *Attorney, Agent, or Firm* — Baker & Hostetler LLP

(57) ABSTRACT

A device and a method for heating a fermentable starting material for beverage production wherein a heat transporting medium is transported in a heat transporting medium circuit in a first flow direction via a heat storage device for storing/emitting heat, a heating medium for heating the heat transporting medium, and a heat emission chamber in which the heat is transferred from the heat transporting medium to the fermentable starting material flowing in a line.

6 Claims, 4 Drawing Sheets

(51) Int. Cl.
*F28D 15/00* (2006.01)
*F28D 20/02* (2006.01)
*F28D 21/00* (2006.01)

(52) U.S. Cl.
CPC .... *F28D 20/021* (2013.01); *F28D 2021/0042* (2013.01); *Y02E 60/145* (2013.01)

(58) Field of Classification Search
USPC ............... 426/520, 64; 99/276, 483; 165/10, 165/104.17–104.31, 108, 902
See application file for complete search history.

(56) References Cited

U.S. PATENT DOCUMENTS

| | | | | | |
|---|---|---|---|---|---|
| 4,164,253 | A | * | 8/1979 | Skala | F24H 7/0433 |
| | | | | | 126/400 |
| 4,184,477 | A | * | 1/1980 | Yuan | F24D 11/003 |
| | | | | | 126/563 |
| 4,246,955 | A | * | 1/1981 | Skala | A47J 27/16 |
| | | | | | 165/104.14 |
| 4,801,462 | A | * | 1/1989 | Tonna | C12C 13/02 |
| | | | | | 426/16 |
| 4,977,953 | A | * | 12/1990 | Yamagishi | C09K 5/063 |
| | | | | | 126/263.01 |
| 4,994,392 | A | * | 2/1991 | Welledits et al. | C12C 7/06 |
| | | | | | 126/351.1 |
| 2002/0000306 | A1 | * | 1/2002 | Bradley | F28D 20/02 |
| | | | | | 165/10 |
| 2009/0148556 | A1 | * | 6/2009 | Stippler | C12C 13/00 |
| | | | | | 426/16 |
| 2011/0041709 | A1 | * | 2/2011 | Rohde | A01J 11/00 |
| | | | | | 99/453 |
| 2011/0219771 | A1 | * | 9/2011 | Stiesdal | F28D 20/021 |
| | | | | | 60/670 |
| 2011/0252835 | A1 | * | 10/2011 | Beihoff | D06F 29/005 |
| | | | | | 68/13 R |
| 2013/0000863 | A1 | * | 1/2013 | Kammerloher | C12C 7/067 |
| | | | | | 165/48.1 |
| 2013/0263574 | A1 | * | 10/2013 | Levin | F01N 5/02 |
| | | | | | 60/273 |
| 2015/0159960 | A1 | * | 6/2015 | Fujitsuka | F25B 30/02 |
| | | | | | 165/10 |
| 2015/0275159 | A1 | * | 10/2015 | Kammerloher | C12C 7/06 |
| | | | | | 426/29 |
| 2015/0376557 | A1 | * | 12/2015 | Welledits | C12C 7/06 |
| | | | | | 426/64 |
| 2016/0029835 | A1 | * | 2/2016 | Zwart | A47J 31/56 |
| | | | | | 99/281 |

FOREIGN PATENT DOCUMENTS

| | | |
|---|---|---|
| DE | 195 35 027 A1 | 3/1997 |
| DE | 198 52 057 A1 | 5/2000 |
| DE | 20 2010 008 126 U1 | 11/2011 |
| DE | 10 2010 041955 A1 | 4/2012 |
| DE | 20 2013 003 048 U1 | 6/2013 |
| EP | 1 705 242 A1 | 9/2006 |
| JP | S60-196547 A | 10/1985 |
| WO | 2011/076410 A1 | 6/2011 |

\* cited by examiner

DEVICE AND METHOD FOR HEATING A FERMENTABLE STARTING MATERIAL FOR BEVERAGE PRODUCTION

CROSS-REFERENCE TO RELATED APPLICATIONS

This application is a National Stage of International patent application PCT/EP2014/056563, filed on Apr. 2, 2014, which claims priority to foreign German patent application No. DE 102013205844.6, filed on Apr. 3, 2013, the disclosures of which are incorporated by reference in their entirety.

FIELD OF THE INVENTION

The invention relates to an apparatus and a method for heating a fermentable starting material for beverage production, respectively.

BACKGROUND

The prior art already describes a device for heating brewing mash, said device being disclosed in document AT 390 266 B. In this device, a line is formed by a regularly wound (helical) tube located within a combustion chamber. The line is connected to a heat source in heat-transferring contact, thereby heating the brewing mash flowing through the line. Such a device is also known as so-called "external boiler". In devices such as the one described with reference to document AT 390 266 B, it is possible to gently heat an arbitrary fermentable fluid within a short time by using a comparatively high temperature.

As some states prohibit the use of a gas or oil burner by law, there is a need for creating an ecologically and economically reasonable alternative to the known device for heating brewing mash.

An inventive device for heating a fermentable starting material for beverage production has a heat transporting medium circuit in which a heat transporting medium is transported in a first flow direction via a heat storage device for storing/emitting heat, a heating medium for heating the heat transporting medium, and a heat emission chamber in which the heat is transferred from the heat transporting medium to the fermentable starting material flowing in a line.

SUMMARY OF THE INVENTION

The invention makes it possible to further apply heat by a heating medium to a heat transporting medium to which heat has already been applied from a heat storage device so as to emit the overall heat in the heat emission chamber to the fermentable starting material flowing in the line. It is also possible only to transport the heat taken from the heat storage device, thereby realizing various heating steps. When a heating process of the fermentable starting material is finished, the heat storage device can be recharged partly or completely with the heat of the heating medium supplied to the heat transporting medium.

Fermentable starting materials according to the invention can be all mixtures of substances or pure substances which contain at least one fermentable substance. A fermentable substance within the meaning of the invention is a chemical compound which can be used under anaerobic and/or aerobic conditions by microorganisms, such as yeasts and bacteria, as energy source and as carbon source. This includes monosaccharides, disaccharides and polysaccharides, in particular. Especially preferred fermentable starting materials are those which contain at least one of fructose, glucose, sucrose, maltose (malt sugar) or starch, or one of their degradation products. In particular, this includes starting materials for the production of beer such as mash, brewer's wort, derived afterproducts (byproducts), raw fruits dissolved in water (such as rice or corn).

According to the invention, the flow direction of the heat transporting medium in the heat transporting medium circuit can be reversed into a second flow direction for charging the heat storage device.

This is particularly advantageous as the heated heat transporting medium can cover shorter distances, which reduces heat losses.

According to the invention, the heat transporting medium circuit may comprise a bypass line which bypasses the heat emission chamber and through which the heat transporting medium is transported during the charging of the heat storage device.

As, in this case, the heat transporting medium does not have to be conducted via a heat emission chamber, energetically more favorable and shorter charging operations are possible.

According to the invention, the transport of the heat transporting medium can take place via a pump which, in a non-activated state, prevents a throughput of the heat transporting medium.

According to the invention, the heat transporting medium can be transported in the first flow direction by a pump provided outside a bypass line bypassing the heat emission chamber whereas the heat transporting medium can be transported in a second flow direction by a pump provided in the bypass line bypassing the heat emission chamber. As each of the pumps is constructed such that, in a non-activated state of the pump, a throughput of the heat transporting medium is prevented, this arrangement of the pumps ensures that the heat transporting medium is transported via the shortest route, respectively, to the heat emission chamber, on the one hand, and to the heat storage device, on the other hand.

According to the invention, the heat storage device may be formed as a latent heat storage device in which a transfer of heat from the heat transporting medium to a phase change material or vice versa can take place.

According to the invention, a paraffin or a salt may be used as phase change material, the preferred condensation temperature being between 130° C. and 150° C., and the recrystallization temperature being between 130° C. and 120° C.

According to the invention, the heating medium can be configured as electrical heating. Moreover, the heat transporting medium can be a thermal oil.

The construction as an electrical heating makes it possible to meet legal conditions e.g. in cases in which gas or oil burners are prohibited. The use of thermal oil may be particularly advantageous as thermal oil may be heated by electric heating members, for example, whereby exhaust gas pollution of the environment is avoided provided the power generation is appropriate (wind power, solar power, water power). In addition, thermal oil can be used for higher temperature ranges without changing its aggregate state or pressure, as its boiling temperature amounts to more than 300° C. under ambient pressure. Therefore, thermal oil may be used in temperature ranges of up to 300° C. Besides, the energetic efficiency of thermal oil is considerably better than that of e.g. water or vapor/steam. A method according to the invention for heating a fermentable starting material for beverage production comprises the steps of:

transporting the fermentable starting material through a line which is conducted through a heat emission chamber, transporting a heat transporting medium in a first flow direction in a circuit via a heat storage device for storing/emitting heat, a heating medium for heating the heat transporting medium, and the heat emission chamber in which the heat is transferred from the heat transporting medium to the fermentable starting material flowing in the line.

According to the invention, the heat storage device can be recharged in a second flow direction after its partial or complete discharge by reversing the flow direction of the heat transporting medium.

Further advantages of the invention become apparent from the following description of currently preferred embodiments; this description has to be taken into account together with the attached Figures.

DETAILED DESCRIPTION

Figure 1:
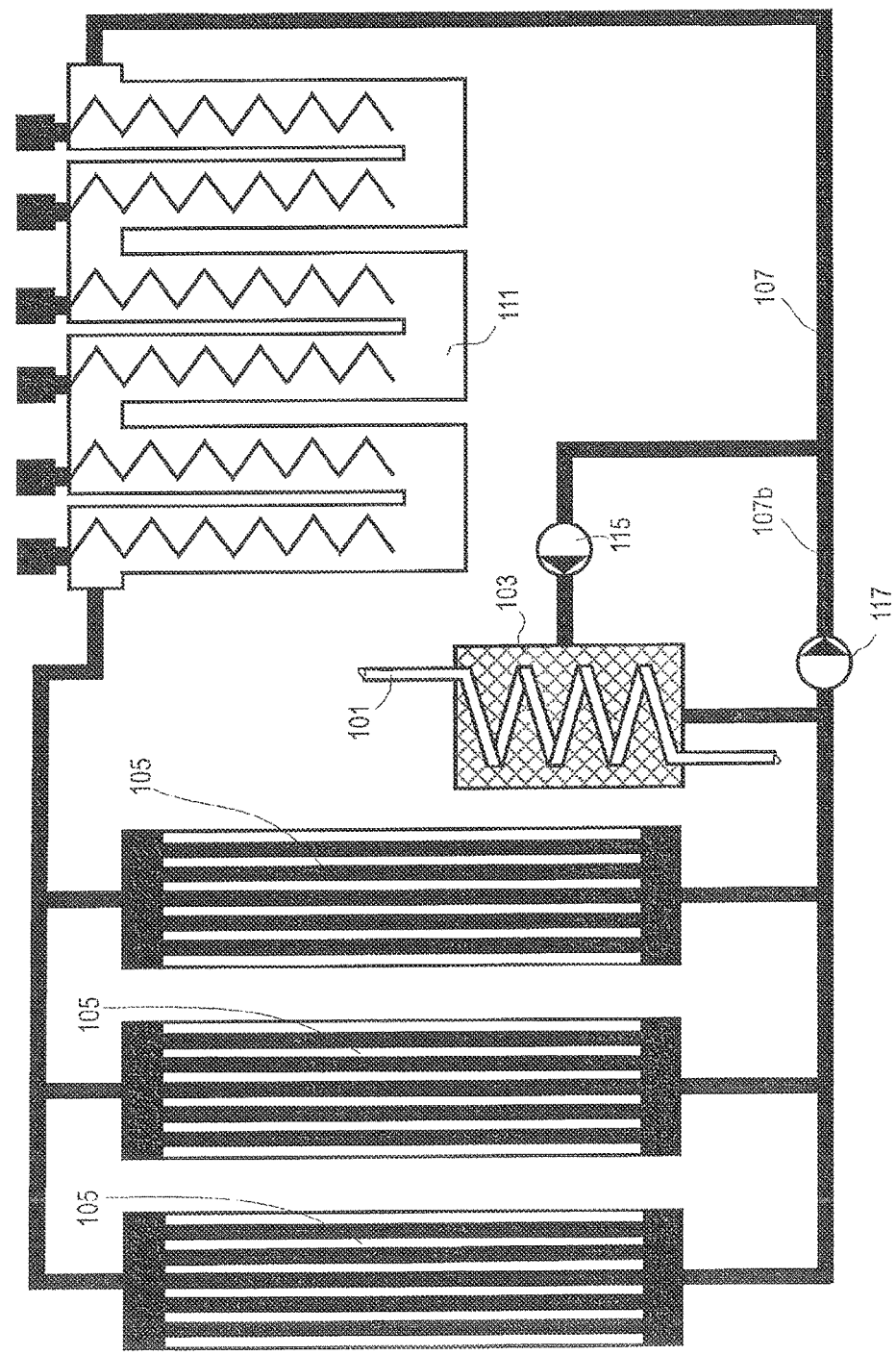
FIG. 1 is a schematic view of a device according to the invention for heating a fermentable starting material for beverage production according to a preferred embodiment of the invention.
Figure 2:
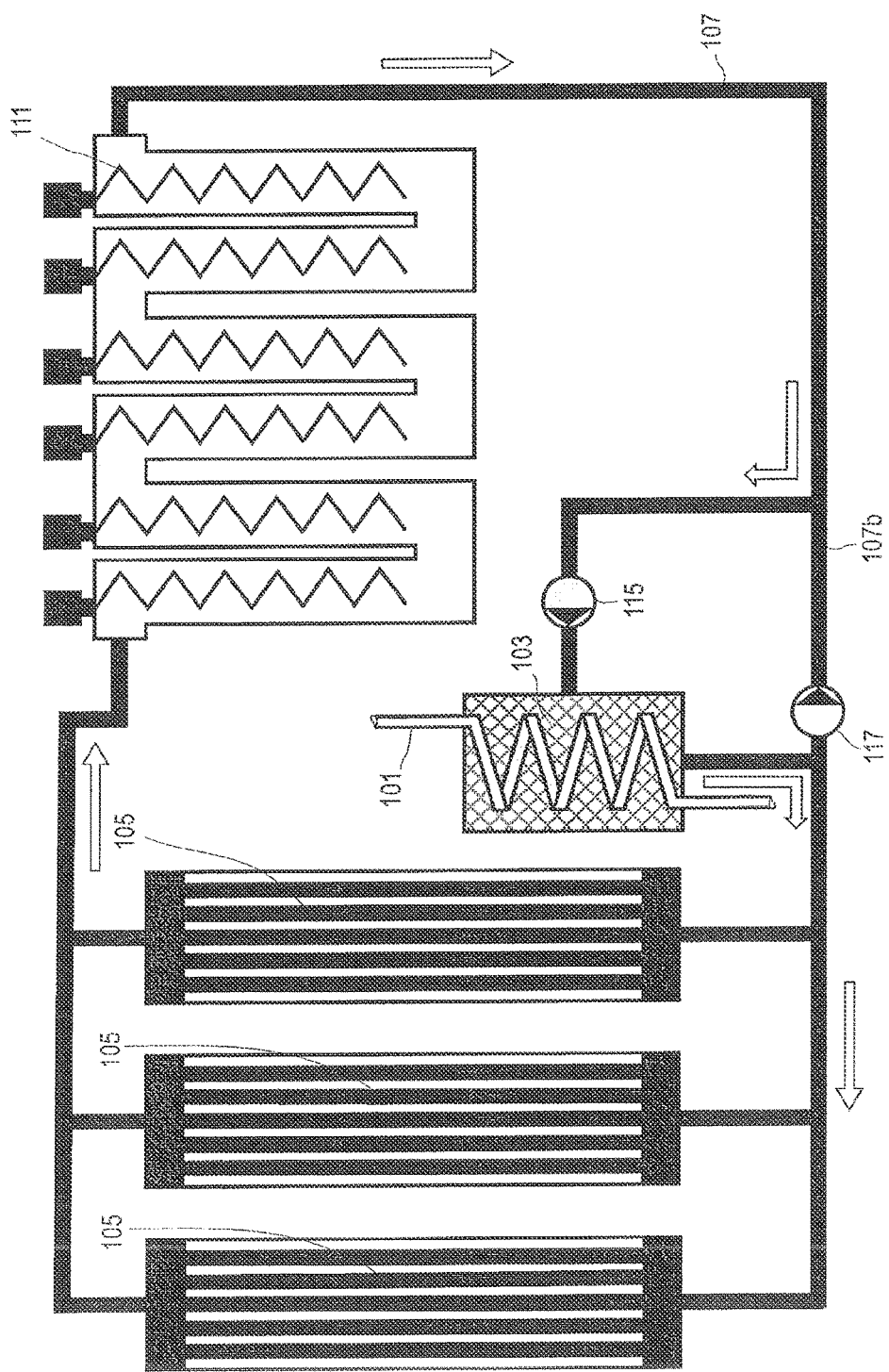
FIG. 2 is a schematic view of a discharging process of a heat storage device in which a fermentable starting material for beverage production is heated.
Figure 3:
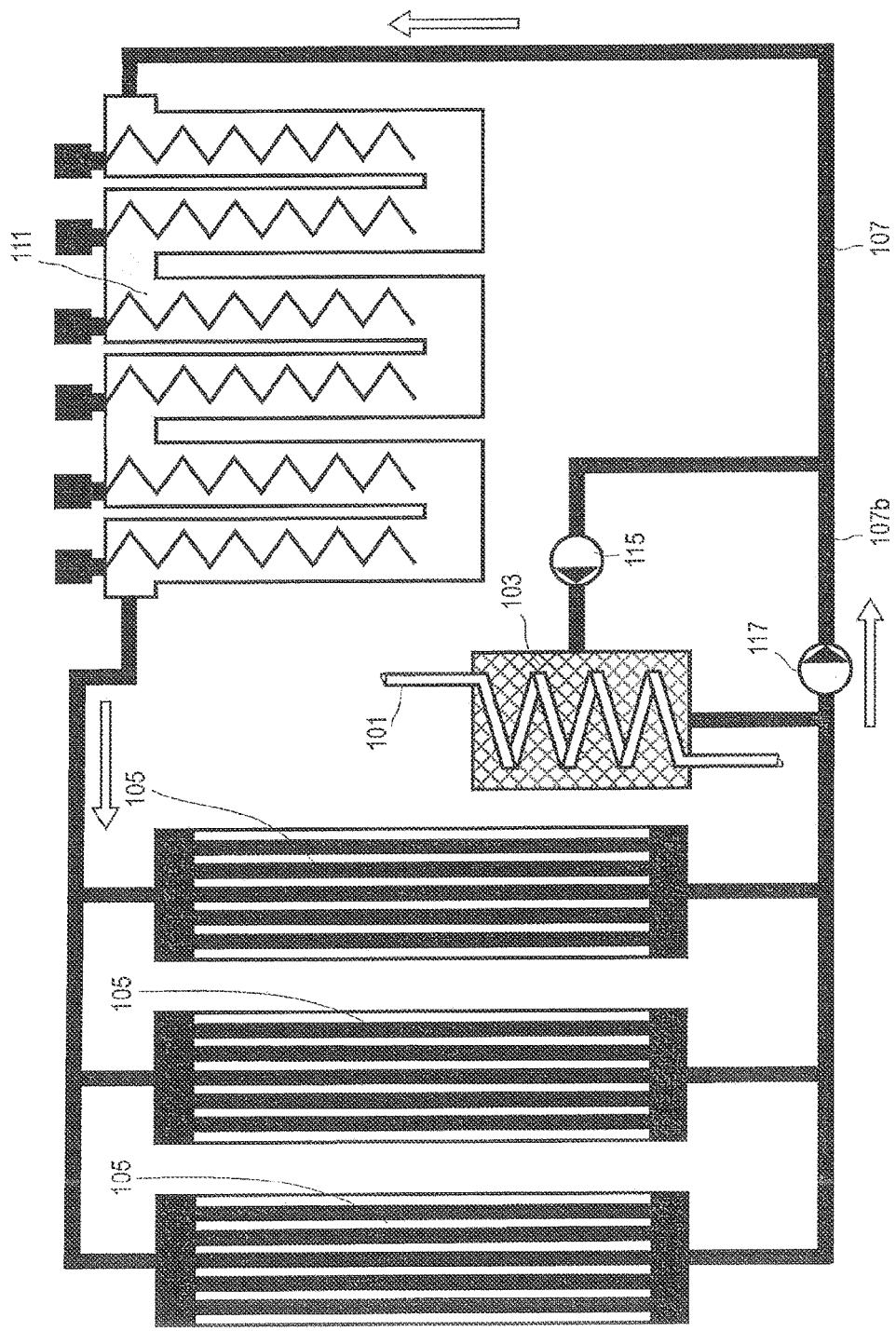
FIG. 3 is a schematic view of a charging process of the heat storage device.

A preferred embodiment of the invention is described by means of FIGS. 1 to 3. In the description of the embodiment, mash and/or wort are used as examples of the fermentable starting material for beverage production.

The inventive device for heating a fermentable starting material for beverage production basically consists of a circuit 107 in which a thermal oil is transported as example of a heat transporting medium according to the invention. A heat storage device (also named "latent storage device") 105, an electric heater (also named "thermo-electric heating") 111 and a heat emission chamber 103 (preferably constructed as an external boiler) are arranged clockwise in the circuit 107.

According to the embodiment, the heat storage device 105 is formed by a plurality of tube bundle storages which are filled with a paraffin as phase change material and which are switched in parallel.

The electric heater 111 is used for heating the thermal oil flowing therethrough. The heated thermal oil gives off its heat to a mash or a wort flowing in a line 101, cooling down in the course thereof. After having flown through the heat emission space, the thermal oil flows back to the heat storage device 105. The flow of the thermal oil in this first flow direction (clockwise in the Figure) is achieved by a pump 115 which, according to the embodiment, is arranged in the first flow direction upstream of the heat emission chamber 103 and is used as a discharge pump (for discharging the heat storage device 105).

Accordingly, it is possible in the case of the heat storage device 105 being charged to heat the thermal oil flowing through the heat storage device 105, to further heat the already heated thermal oil in the electric heater 111 and to emit the heat in the heat emission chamber 103 to the mash or the wort, thereby heating the same.

When doing so, it is also possible to conduct the thermal oil through the electric heater without activating the same. Accordingly, in this case, the thermal oil only transports the heat removed from the heat storage device 105.

Moreover, the device for heating mash or wort according to the embodiment disposes of a bypass line 107b for bypassing the heat emission chamber 103. A pump 117 which pumps the thermal oil in a direction opposite to that of pump 115 is provided in the bypass line 107b.

After a heating process of the mash or wort has been terminated, the invention provides that the flow direction of the thermal oil in the thermal oil circuit 107 can be reversed into a second flow direction by switching off the pump 115, also designated as discharge pump, and by activation of the pump 117, also designated as charging pump. Thus, the thermal oil which is now transported in the second flow direction (counter-clockwise in the Figure) can be transported through the electric heater 111 and can be heated in the same so as to be afterwards transported through the heat storage device 105 in which it then re-emits the heat taken up by the electric heater 111 to the paraffin as phase change material in order to recharge the heat storage device 105.

FIG. 2 schematically shows a discharge operation of the heat storage device 105 or a heating process of the fermentable starting material for beverage production transported in the line 101. In FIG. 2, the white arrows mark the flow direction of the thermal oil in the thermal oil circuit 107. The heated thermal oil is transported in the line between the heat storage device 105 and the heat emission chamber 101. Here, it should be noted that the thermal oil heated by the heat discharged from the heat storage device 105 can be further heated while flowing through the electric heater 111 so as to cover a peak demand for heat, but that this is not absolutely necessary.

The heated thermal oil is then transported by the operation of the discharge pump 115 further on to the heat emission chamber 103 where the heat is emitted from the heated thermal oil to the mash or wort flowing in the line 101. The cooled down thermal oil then flows in the line in the first flow direction (clockwise in the Figure) downstream from the heat emission chamber 103 on to the heat storage device 105.

FIG. 3 schematically shows a charging operation of the heat storage device 105 which is carried out when a heat emission to the starting material for beverage production flowing in the line 101 is not required. This may e.g. be the case when the heated starting material for beverage production is cooled down again e.g. in the course of a lautering process, or when the beverage production is completely at rest. In this case, the cooled-down thermal oil is pumped from the heat storage device 105 by the charging pump 117 in the second flow direction (counter-clockwise in the Figure) through the bypass line 107b to the electric heater 111, where the thermal oil is heated. The heated thermal oil is conducted by the electric heater 111 on to the storage device 105 where it emits the heat to the paraffin used as phase change material so as to liquefy the same. After a complete liquefaction of the paraffin, the heat storage device 105 is fully charged.

Preferably vane pumps or gear pumps are used as pumps 115, 117, which ensure a fixedly defined liquid throughput per rotation and, on the other hand, when being in a switched-off state, do not allow the thermal oil to flow through due to e.g. pressure differences. Two flow directions are possible in the area of the storage device 105 and the charging system (heater 111), only one flow direction in the area of the discharge system (heat emission chamber 101 or external boiler).

Preferably, the heat storage device is provided in an upright position in which its height is considerably larger than its width and depth or its diameter. The bundles of pipes are arranged substantially parallel to a vertical axis.

While charging takes place (e.g. overnight), the charging pump 117 is activated; it removes the cold thermal oil from the bottom of the latent heat storage device(s) 105, heats the cold thermal oil when flowing through the thermoelectric additional heater 111 and conducts the hot thermal oil back into the top of the latent heat storage device 105. The latent heat storage device 105 is charged from the top to the bottom. In this function, the discharge pump is not operating and, due to its design, prevents an undesired flow through the external boiler 103.

When discharging takes place, with or without the thermoelectric additional heater 111, the flow direction in the latent heat storage device is reversed. The charging pump is not operating and, due to its design, prevents the thermal oil from flowing through. The discharge pump is operating and draws the hot thermal oil from the latent heat storage device. The thermal oil can additionally be heated by the thermoelectric additional heater. This can be variably regulated by the external boiler in dependence on the preselected heating power of the entire system. Further, the discharge pump 115 conducts the cooled-down thermal oil from the bottom back into the latent heat storage device 105.

So as to avoid temperature peaks in the external boiler when switching from pure charging to discharging with or without the additional heater, switching by the pumps takes place in a preferably sliding manner. This means that the discharge pump is slowly additionally switched on while the charge pump is still working, the electric additional heater 111 is stopped as there is a short-term slack in the thermoelectric heating system 111 and, subsequently, the charge pump is shut down. This makes the flow direction change and the heating elements of the electric additional heater 111 can be reactivated. The advantage of a flow reversal with pure charge compared to a discharge with or without an additional heater results from the thermo-syphon effect inside the latent heat storage device, this allowing a higher charging degree.

On the other hand, the charging degree in the discharge operation is irrelevant as only the additional heating takes place electrically and the increasing decrease in temperature of the thermal oil due to the decreasing capacity of the latent heat storage device is to be compensated, or rather the missing energy is to be fed in supplementarily.

Thus, by using the inventive device for heating mash and wort, a necessary electrical connection value can be reduced by about 60% with the performance data remaining the same; thereby, not only the availability costs (e.g. US$ 6,000.00/1 kW above network availability) can be reduced considerably but also a connection value of less power can be reached, which may also be achieved more easily by using alternative energies.

The following is to be an example of an application of a device for heating a fermentable starting material for beverage production according to the invention, based on an example of a brew for beer production.

The energy amount for a brew results from the volume, the temperature differences of the brewing medium and the time pattern of the process. For instance, this energy quantity (heat quantity) can amount to 161 kWh for a 10 hl decoction brew in connection with an external boiler. So as to keep within the necessary time frame, an energetic connection value of 88 kW has to be available for the heating. When using a liquid gas burner, this value can be reached easily and is also unproblematic regarding the amount of only 12.5 kg of liquid gas.

However, in view of the costs, on the one hand, and in view of the feasibility, on the other hand, it may be difficult or even impossible to provide this connection value of 88 kW in the form of electrical energy.

The device according to the invention, comprising the latent heat storage device with the phase change material, enables the storing of heat in a high-temperature range—e.g. between 130° C. and 150° C. When doing so, it is possible to reach a complete charging of the latent heat storage device also by using an electric charging device (thermoelectric heater) with a comparably low connection value. Besides, when the latent heat storage device is discharged, this thermoelectric heating can be used for providing additional heating, i.e. the temperature of the thermal oil as heat transporting medium can be further increased.

The dimensioning of the latent heat storage device in dependence on the thermoelectric charging power has to be coordinated in connection with the external boiling system.

One example shall be given on the basis of the following data:

Brewhouse capacity: 10 hl cast wort;
Brewing method used: increasing infusion;
Mashing temperature: 52° C.;
Storage capacity of the latent heat storage device: 80.62 kWh;
Thermoelectric thermal oil heating: 30 kW.

For the mashing work from 52° C. to 78° C., a heat quantity of approx. 35.19 kWh is required. This heat quantity can be discharged from the latent heat storage device without any additional heating. After the mashing work, there still remains a heat quantity of 35.19 kWh in the latent heat storage device. During a first lautering process (first wort) the thermoelectric heating recharges the latent heat storage device. The time available for this amounts to approx. 45 min. During this period of time, the latent heat storage device is again supplied with a heat quantity of 22.5 kWh via the thermoelectric heating, so that the latent heat storage device has approx. 57.69 kWh of energy after the end of this partial charging.

Upon the start of a second lautering process (second worts), the wort already being in the brewing pan has to be heated to the boiling temperature. This has to be done within a time period corresponding to the duration of the second lautering process. The heating starts at 72° C. and ends at 98° C. At the same time, a steadily growing amount of colder lautering wort is subsequently added from the second worts into the pan. Approx. 65.5 kWh of heat are required for this process. The heat is gained by discharging the latent heat storage device, on the one hand but additionally also from the thermoelectric heating. This process takes approx. 60 min., the charging capacity of the thermoelectric heating amounting to 30 kWh.

When starting out from the remaining heat quantity of the pre-process in the latent heat storage device, from the discharging and the charging, a heat quantity of approx. 22.19 kWh remains from the heat balance in the latent heat storage device after the end of this process.

The last process is the wort boiling, for which approx. 36.40 kWh are required. Due to the use of the thermoelectric additional heating and the energy remaining from the pre-process in the latent heat storage device, there still remains a heat quantity of approx. 15.79 kWh in the latent heat storage device after the wort boiling is terminated.

After the brewing process is concluded, the latent heat storage device can be recharged to 100% within 2 hours by means of the thermoelectric heating (30 kW power). No simultaneous discharge takes place. Thus, it is possible to achieve the same power values of an electric heating having a power of 88 kW by instead using an electric heating only having a power of 30 kW. The entire heat quantity available is approximately equal, only the peak performance is covered by the storage system.

Particularly, in remote areas, the availability of electrical energy may also be problematic in general. In such cases, the thermoelectric heating system can be replaced by alternative systems such as thermo-solar energy systems or also block-unit power stations having combustion engines. Advantageously, it is possible not only to use the gained electrical energy, but also the waste heat of the combustion engine for heating the thermal oil in the circuit.

Figure 4:
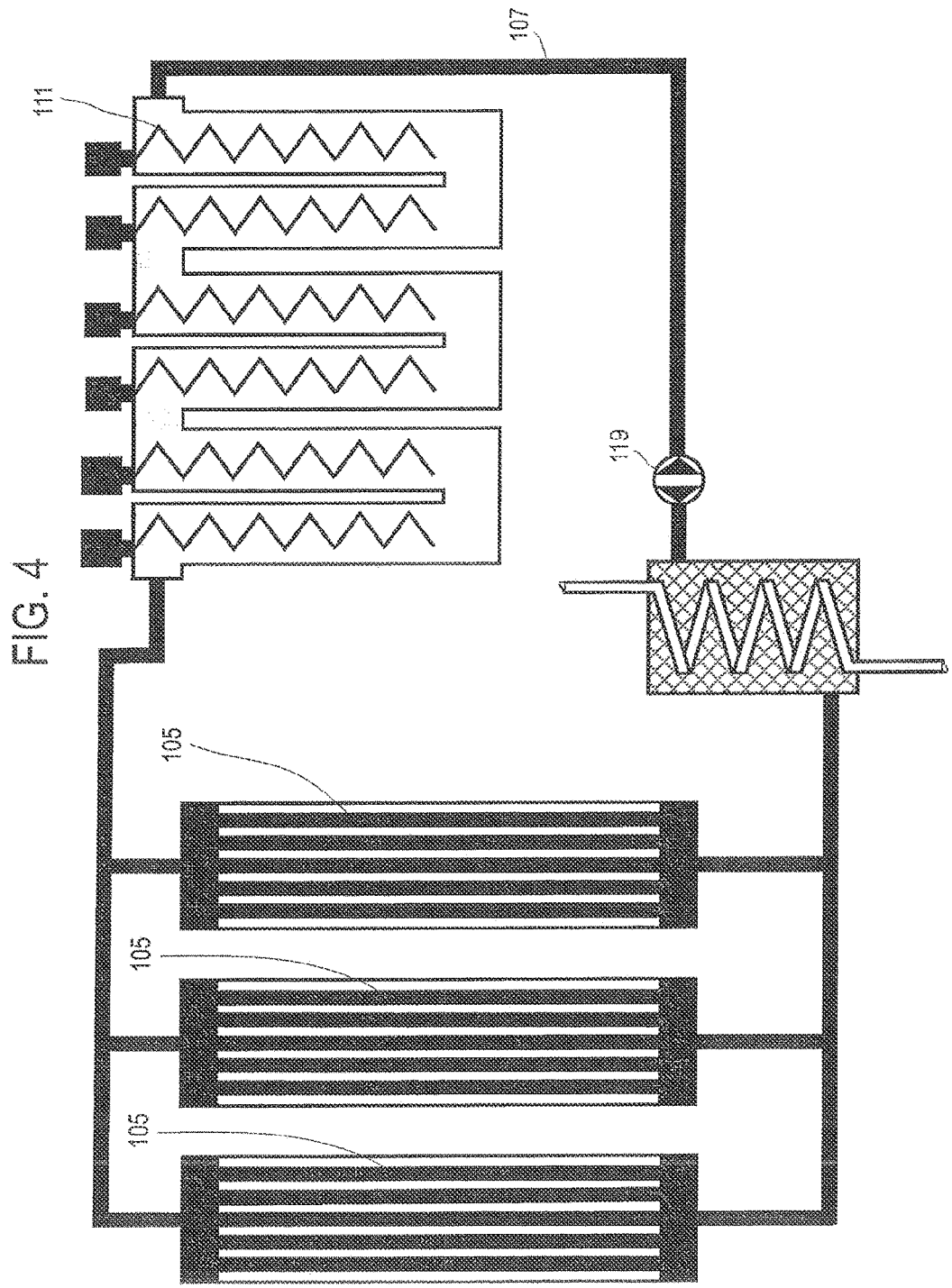
FIG. 4 is an alternative to the preferred embodiment of the invention.

FIG. 4 shows an alternative to the devices for heating a fermentable starting material for beverage production, as shown in FIGS. 1 to 3. The difference to the above presented device consists in that a reversible pump 119 is provided, capable of pumping the thermal oil as heat transporting medium in the first and in the second flow direction. Accordingly, according to this variant, also the bypass line 107b may be canceled.

While the invention has been described with reference to currently preferred embodiments, it shall be pointed out that the area of the invention is only defined by the attached claims. Advantageous modifications within the scope of the claims are possible at any time.

In particular, it is possible to use, instead of an electrical heating, a heating on the basis of thermo-solar energy or a block-unit power station having a combustion engine. In this case, the discharge heat from the exhaust train of the block-unit power station can be used for heating the phase change material in the heat storage device via the thermal oil circuit. This variant is particularly interesting for remote areas in which the availability of electrical energy is not always given.

Instead of arranging the charge and discharge pumps of FIGS. 1 to 3 in the shown manner, one single reversible pump can be provided, and the flow through the heat emission chamber 103 or the bypass line 107b can be caused by valves or equivalent means.

The invention claimed is:

1. A device for heating a fermentable starting material for beverage production, the device comprising:
a heat transporting medium circuit configured to transport a heat transporting medium in a first flow direction and a second flow direction, the heat transporting medium circuit including a bypass line;
a heat storage device configured to store heat from the heat transporting medium;
a heating medium configured to heat the heat transporting medium; and
a heat emission chamber configured to transfer heat from the heat transporting medium to the fermentable starting material flowing through the heat emission chamber;
wherein the heat storage device is formed as a latent heat storage device in which a transfer of heat takes place from the heat transporting medium to a phase change material in the latent heat storage device or from the phase change material to the heat transporting medium, and
wherein the bypass line is configured to transport the heat transporting medium from the heating medium to the heat storage device in the second flow direction to bypass the heat emission chamber and transfer heat to the heat storage device.

2. The device of claim 1, further comprising a pump configured to transport the heat transporting medium and to prevent the transport of the heat transporting medium when the pump is in a non-activated state.

3. The device of claim 1, further comprising:
a first pump positioned outside of the bypass line and configured to transport the heat transporting medium in the first flow direction; and
a second pump positioned in the bypass line and configured to transport the heat transporting medium in the second flow direction.

4. The device of claim 1, wherein the phase change material comprises a paraffin or a salt, and wherein the phase change material has a condensation temperature between 130° C. and 150° C. and a recrystallization temperature between 130° C. and 120° C.

5. The device of claim 1, wherein the heating medium comprises an electrical heater and/or the heat transporting medium comprises a thermal oil.

6. A method of heating a fermentable starting material for beverage production, the method comprising:
transporting the fermentable starting material through a heat emission chamber,
transporting a heat transporting medium in a first flow direction in a circuit to a latent heat storage device to transfer heat from the heat transporting medium to a phase change material in the latent heat storage device;
transporting the heat transporting medium to a heating medium to heat the heat transporting medium;
transporting the heat transporting medium to the heat emission chamber to transfer heat from the heat transporting medium to the fermentable starting material flowing through the heat emission chamber; and
transporting the heat transporting medium to the latent heat storage device from the heat medium in a second flow direction through a bypass line to bypass the heat emission chamber and transfer heat to the latent heat storage device.

* * * * *